(12) United States Patent
Eberts et al.

(10) Patent No.: US 7,897,526 B1
(45) Date of Patent: Mar. 1, 2011

(54) SILICONE NANOCOMPOSITE COATINGS FOR FABRICS

(75) Inventors: Kenneth Eberts, Westfield, NJ (US); Stein S. Lee, Memphis, TN (US); Amit Singhal, Piscataway, NJ (US); Runqing Ou, South River, NJ (US)

(73) Assignee: NEI, Corp, Somerset, NJ (US)

( * ) Notice: Subject to any disclaimer, the term of this patent is extended or adjusted under 35 U.S.C. 154(b) by 276 days.

(21) Appl. No.: 11/827,710

(22) Filed: Jul. 13, 2007

Related U.S. Application Data (60) Provisional application No. 60/830,503, filed on Jul. 13, 2006.

(51) Int. Cl.
*B32B 27/12* (2006.01)
*B32B 27/18* (2006.01)

(52) U.S. Cl. .......... 442/81; 442/87; 442/148; 977/773; 977/778; 977/779; 428/332; 428/357; 428/402

(58) Field of Classification Search .......... 428/391, 428/447, 332, 357, 402; 977/773, 778, 779; 442/81, 87, 148
See application file for complete search history.

(56) References Cited

U.S. PATENT DOCUMENTS

| | | | |
|---|---|---|---|
| 6,376,590 B2 | 4/2002 | Kolb et al. | |
| 6,420,037 B1 * | 7/2002 | Tsuji et al. | 428/447 |
| 6,562,891 B1 * | 5/2003 | Tsai et al. | 524/445 |
| 2004/0058601 A1 | 3/2004 | Parker | |
| 2004/0220419 A1 * | 11/2004 | Gottschalk-Gaudig et al. | 556/10 |
| 2005/0137321 A1 | 6/2005 | Dumont et al. | |

OTHER PUBLICATIONS

Guermeur et al., "Hybrid polydimethylsiloxane-zirconium oxo nanocomposites. Part 1 Characterization of the matrix and the siloxane-zirconium oxo interface", Journal of Materials Chemistry, Mar. 1999, 9 p. 769-778.*

* cited by examiner

*Primary Examiner*—D. Lawrence Tarazano
*Assistant Examiner*—Matthew D Matzek
(74) *Attorney, Agent, or Firm*—William L. Botjer (57) ABSTRACT

A silicone based coating for fabrics utilizing dual nanocomposite fillers providing enhanced mechanical and thermal properties to the silicone base. The first filler includes nanoclusters of polydimethylsiloxane (PDMS) and a metal oxide and a second filler of exfoliated clay nanoparticles. The coating is particularly suitable for inflatable fabrics used in several space, military, and consumer applications, including airbags, parachutes, rafts, boat sails, and inflatable shelters.

20 Claims, 4 Drawing Sheets

SILICONE NANOCOMPOSITE COATINGS FOR FABRICS

REFERENCE TO RELATED APPLICATIONS

This application claims priority from U.S. provisional application Ser. No. 60/830,503 filed Jul. 13, 2006

STATEMENT OF GOVERNMENT SUPPORT OF INVENTION

The work leading to the present application was done as part of a NASA SBIR Phase I contract no. NNL06AA50P

BACKGROUND OF THE INVENTION AND PRIOR ART

Inflatable fabrics used in several space, military, and consumer applications, including airbags, parachutes, rafts, boat sails, and inflatable shelters have a silicone coating over the fabric, which imparts special performance characteristics to the inflatable structure. For example, with respect to airbags for aerospace applications (such as those used for landing the Mars Pathfinder on the surface of Mars), silicone coatings improve the seam strength, resist unwanted permeation of air through the fabric, protect the base fabric from being degraded by the environment, and provide chemical and environmental stability to the fabric (Cadogan, D., Sandy, C., and Grahne M., "Development and Evaluation of the Mars Pathfinder Inflatable Airbag Landing System" 49th International Astronautical Congress, Sep. 28-Oct. 2, 1998/Melbourne, Australia). Additionally, silicone coatings exhibit one to two orders of magnitude less erosion compared to their organic counterparts when the airbag is in low earth orbit (LEO). Silicones (also called siloxane polymers) form $SiO_2$ barrier films when exposed to atomic oxygen in a terrestrial environment (D. P. Dworak and M. D. Soucek, Progress in Organic Coatings, 47, 448 (2003), and Richard H. Parker, US Patent application, US 20040058601 (2004). Improving the mechanical and thermal properties of silicone coatings would enable the use of lighter fabrics, thereby leading to weight reduction of inflatable structures.

Specifically, silicone coatings with superior mechanical properties (e.g., tear strength, puncture resistance and tensile strength) will allow reductions in the mass and thickness of coated fabrics. For example, the mass limit on the airbag system that was used on the pathfinder for the Mars mission was 32 kg. By reducing the mass and volume of the airbags, engineers will have greater flexibility in designing highly compacted deflated structures that survive deployment, protect astronauts and the fabric from excessive heat, maintain structural performance, and effectively contain gases used for inflation and/or breathing atmospheres in space.

Previously, it has been shown that nanoparticles, specifically clay nanoparticles, can improve the mechanical properties (e.g., tensile strength) of cross-linked silicone matrices and poly(dimethylsiloxane) (PDMS) elastomers (F. X. Deneubourg, A. Beigbeder, Ph. Degée, P. Viville, and Ph. Dubois, http://morris.umh.ac.be/SMPC/Posters/2006-BPG-FRDE.pdf, Schmidt, D. F., "Polysiloxane/Layered Silicate Nanocomposites: Synthesis, Characterization, and Properties", Ph.D. Dissertation, Cornell University, May (2003), and H. Takeuchi and C. Cohen, Macromolecules, 32, 6792 (1999)). However, until now no commercial efforts have been made to improve the performance of "commercial" silicone coating formulations using nanomaterial additives. Some commercial silicone coating formulations contain filler particles, e.g. liquid silicone rubber (LSR) from Dow Corning contained 15-40 wt % of modified silica particles. The present invention has demonstrated that a "dual nanocomposite system" can enhance the mechanical properties (e.g., tear strength) of a silicone coated fabric without significantly degrading other important coating properties, such as hardness, thermal stability and puncture resistance. The present invention provides significant benefits to the field of silicone coatings since the focus is not to change the chemistry of individual coating components, but rather to combine the attributes of two fundamentally different nanophase additives (also referred as nanomaterials).

Although not limited to one type of silicone coating, the focus of this application is on liquid silicone rubber (LSR) elastomers, which are used for a broad range of industrial fabric (e.g., Fiberglass®, Kevlar® {poly-paraphenylene terephthalamide}, Nylon, and Vectron® {liquid crystal aromatic polyester}) coating applications, including automobile airbags. Silicone elastomers on cross-linking form a three dimensional network. LSR is a two components coating formulation containing part A and part B and cured by an addition reaction as described below:

[1]

This reaction can be accelerated by heat, and it has no byproducts. The coatings are typically cured by heating at 160-180° C. for a few minutes. The "potlife" of the material varies with the inhibitor/catlayst level. Generally, most LSRs have a 24-hour potlife. LSR coatings have good chemical inertness, and they are highly resistant to water, weak acids and bases, polar solvents and a wide variety of chemicals.

Fillers, such as amorphous silica, are often added to the silicone matrix to give greater reinforcement [Rajan, G. S., Sur, G. S., Mark, J. E., Schaffer, D. W., and Beaucage, G., "Preparation and Characterization of Some Unusually Transparent Poly(dimethylsiloxane) Nanocomposites", J. Poly. Sci., Part B: Poly. Phys., 41, 1897-1901 (2003)]. Calcium carbonate has been shown to be effective in improving combing strength for airbag applications when using a peroxide curing system [Dumont, L. and Pouchelon, A., "Silicone Composition and Process that is Useful for Improving the Tear Strength and Combing Strength of an Inflatable Bag for Protecting an Occupant of a Vehicle", U.S. Patent Application US2005/0137321 A1, Jun. 23, 2005]. Layered silicates based on unmodified or organically modified montmorillonites have also been explored [Schmidt, D. F., "Polysiloxane/Layered Silicate Nanocomposites: Synthesis, Characterization, and Properties", Ph.D. Dissertation, Cornell University, May (2003)]. These materials exhibited similar performance as those of traditional silicones reinforced with silica. In-situ techniques especially for forming silica or titania have also been used with some success for creating nanocomposites [Rajan, G. S., Sur, G. S., Mark, J. E., Schaffer, D. W., and Beaucage, G., "Preparation and Characterization of Some Unusually Transparent Poly(dimethylsiloxane) Nanocomposites", J. Poly. Sci., Part B: Poly. Phys., 41, 1897-1901 (2003)]. Poly(dimethylsiloxane)—zirconia nanocomposites have been produced, but the focus of this work was to produce hybrid gels, which are annealed at a high temperature (>1000° C.) to produce nanocomposite ceramics or glasses [Dire et al., Chem. Mater., 10, 268 (1998)].

Zirconia, as well as other ceramic materials, are also used as fillers in polymer materials [Kolb, B. U. and Chien, B. T., "Zirconia Sol, Process of Making and Composite Material", U.S. Pat. No. 6,376,590 B2 (2002)]. In trying to produce zirconia-based nanocomposites, several approaches have been used for forming the zirconia in-situ. These include zirconium precursors based on zirconium alkoxides, complexes with organic or inorganic molecules, and water-soluble salts. The formation of zirconia in polymethylmethacrylate (PMMA) has been studied to some extent. One unique approach has been to use a silica precursor, silicic acid and a small amount of a silane coupling agent to stabilize zirconia grown from zirconium oxychloride salt for polymethylmethacrylate systems [Wang, H. Xu, P., Zhong, W., Shen, L., and Du, Q., "Transparent poly(methyl methacrylate)/silica/zirconia nanocomposites with excellent thermal stabilities", Polymer Degradation and Stability, 87, 319-327 (2005)]. An additional salt precursor approach for making stable zirconia sols has involved the use of polyether acids which are often carboxylic acid based [Kolb, B. U. and Chien, B. T., "Zirconia Sol, Process of Making and Composite Material", U.S. Pat. No. 6,376,590 B2 (2002)].

In the case of zirconium alkoxides, they react vigorously with water, and if the rate of the condensation reaction is not controlled, an immediate precipitation of hydrated zirconia occurs. Using a zirconia alkoxide precursor and a surfactant by itself does not prevent agglomeration of the zirconia in polymethylmethacrylate systems, even when using water-in-oil microemulsions due to the reactivity of the zirconia precursor [Palkovits, R., Althues, H. Rumplecker, A., Tesche, B. Dreier, A., Holle, U., Fink, G., Cheng, C. H. Shantz, D. F. and Kaskel, S., "Polymerization of w/o Microemulsions for the Preparation of Transparent SiO2/PMMA Nanocomposites", Langmuir, 21, 6048-6053 (2005)]. Some success in PMMA systems has been accomplished by initial transesterfication of zirconia alkoxides with 2-hydroxyethyl methacrylate and then free radical polymerization with methylmethacrylate monomer [Di Maggio, R., Fambri, L., and Guerriero. A., Chem. Mater., 10, 1777 (1998]. In the present invention, the reactivity of zirconium alkoxide with water is retarded by reacting them with PDMS molecules with terminal OH groups to form zirconia/PDMS nanosized clusters.

Figure 1:
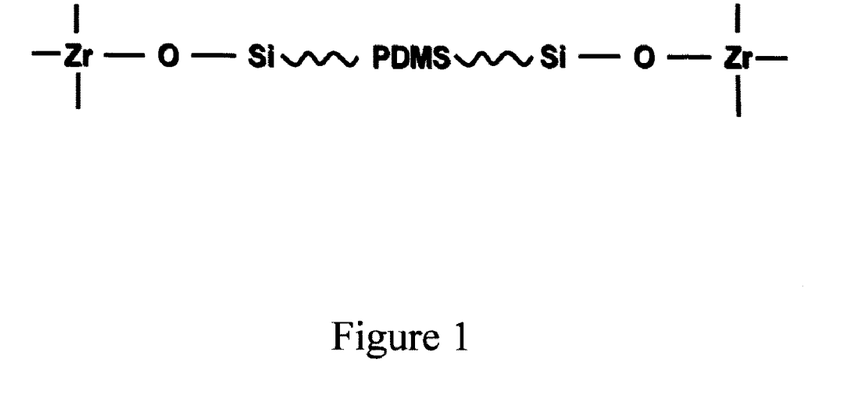
FIG. 1 illustrates the proposed linear structure ("structure I") of zirconia/PDMS cluster at $[OH]_{PDMS}/Zr$ ratio of 1 as used in the silicone coating of the present invention.
Figure 2:
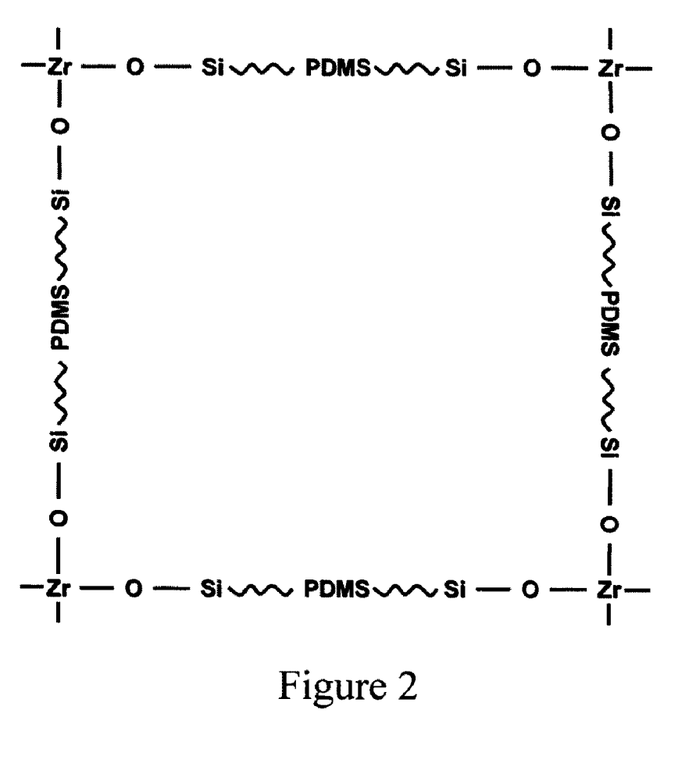
FIG. 2 illustrates the proposed tetrameric structure ("structure II") of zirconia/PDMS cluster at $[OH]_{PDMS}/Zr$ ratio of 2 as used in the silicone coating of the present invention.

The configuration or the structure of zirconia/PDMS nanosized clusters can be modified by varying the ratio of the OH groups coming from the PDMS oligomer ($[OH]_{PDMS}$) to Zr. For instance, theoretically, a $[OH]_{PDMS}$/Zr ratio of 1 will lead to a linear zirconia/PDMS cluster (referred as Structure I, shown in FIG. 1), while raising the ratio to 2 will result in a tetrameric zirconia/PDMS cluster (referred as Structure II, shown in FIG. 2). It is anticipated that the functional groups (e.g., OH, —CH═CH$_2$) on zirconia/PDMS clusters will react with ≡Si—H groups of the component B of the silicone coating formulation to form chemical bonding between the elastomeric silicone network and zirconia/PDMS nanosized clusters. Mechanical properties of the silicone coating will depend upon the structure and size of zirconia/PDMS clusters and the extent of cross-linking between clusters and elastomeric silicone network because chemically bonded zirconia/PDMS nanosized clusters can assist in forming a bimodal silicone elastomeric network, i.e. a network composed of both short and long chains.

In bimodal networks, short chains are end-linked with relatively long chains. It is postulated that while short chains contribute in enhancing the ultimate strength of elastomers, the long chains control the elongation-to-break ratio of the elastomer [J. E. Mark, Acc. Chem. Res., 37, 946-953 (2004)]. On the other hand, organically modified platelet-shaped clay particles act more as nanoscale fillers and do not alter the elastomeric network, but allow load transfer to the matrix at relatively small weight fraction because of their nanosized nature.

SUMMARY OF THE INVENTION

The "dual nanocomposite system" described here is a novel approach to improve mechanical properties and gas barrier properties by adding traditional nanoscale fillers (e.g., platelet-shaped nano-clay particles) and simultaneously modifying the elastomeric network with zirconia/PDMS nanosized clusters. In addition, varying the structure and the size of zirconia/PDMS clusters will further help in optimizing the cross-linking density and the mechanical properties of elastomeric network because of the difference in the functionality, the molecular weight and the configuration of short-chains.

Figure 3:
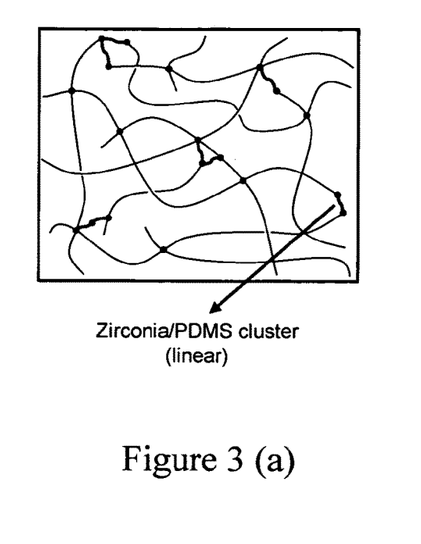
FIG. 3 is a schematic illustrating a bimodal elastomeric network of the present invention with (a) linear and (b) tetrameric zirconia/PDMS clusters as short chains.

The dual nanocomposite approach is fundamentally different from simply adding two types of nanofillers, such as ceramic (e.g., $Al_2O_3$, $ZrO_2$) and clay nanoparticles. Instead, it provides a unique way of incorporating multiple functionalities by controlling the microstructure of the nanocomposite and the structure of the matrix itself Schematics of bimodal networks with linear and tetrameric zirconia/PDMS clusters as short chains are shown in FIGS. 3a and 3b, respectively.

Though the present invention teaches the use of zirconia-based nanosized clusters in modifying the elastomeric network, the approach is generic and other ceramic systems (e.g., alumina, yttria and hafnia) can be used as well, with the cluster size preferably in the range of 1 to 100 nm and more preferably with average clusters sizes in the range of 5-10 nm. Additionally, the invention teaches the use of organically modified clay nanoparticles (but it is not limited to) in conjunction with functional ceramic nanosized clusters. However, this concept can be easily implemented to other traditional ceramic nanofillers or nanoparticles, such as alumina, silica, silicon carbide, zirconia, and boron carbide, which can also be used in conjunction with functional ceramic nanosized cluster. The teaching of the present invention of using a dual nanocomposite system in LSR coatings, which is a high temperature vulcanizing (HTV) system, can be extended to other silicone chemistries, such as room temperature vulcanizing, low temperature vulcanizing and peroxide activated cure systems.

We have found that stable Zirconia sols can be created from simple Zirconium alkoxides and dihydroxyl functional siloxane oligomers in a cyclic siloxane medium. Without the siloxane oligomer the zirconium alkoxide rapidly hydrolyzed and precipitated out of solution. Synthesizing these stabilized zirconia sols in the cyclic siloxane ensured high compatibility with part A of the LSR coating formulation.

We have demonstrated that an organically modified montmorillonite clay can be at least partially exfoliated (a known process of separating clay platelets from each other to produce effective reinforcement of polymers with relatively small weight fraction loading), if not fully, in a cyclic siloxane. Incorporating this nanoclay dispersion within the commercial LSR coating formulation resulted in improvements in tear strength of coated fabrics. Freestanding films of the LSR formulation with and without the clay were compared. Although the visual transparency is diminished somewhat, the film containing the nanoclay appears homogeneous, which is evidence of a well-dispersed and at least partially exfoliated nanocomposite. Transparency of the coating is an indicator of how small the particles are. Homogenously dispersed nanoscale particles (in this case fully exfoliated clay particles) with a feature or particle size typically 25 nm will be small enough not to scatter visible light and making the composite optically transparent.

The addition of 3 wt % clay nanoparticles significantly reduces the Persoz hardness of pure coating, cured under same temperature and time conditions. The negative effect of clay particles on the hardness was alleviated by incorporating zirconia/PDMS clusters. It was observed that combining the nanoclay and zirconia/PDMS nanosized clusters resulted in a significant improvement in tear strength of coated fabric while minimizing the reduction in the Persoz hardness of the pure silicone coating.

Building on these results, we have also demonstrated that simultaneous addition of zirconia/PDMS nanosized clusters and nanoclay particles into an LSR coating formulation can optimize mechanical properties (e.g., hardness and tear strength) of coatings. The dual nanocomposite system offers potential formulations that could provide a desired balance in enhanced properties for a given application.

This dual nanocomposite system can, in addition to the improvements already mentioned, provide improvements in gas barrier properties, abrasion resistance, combing strength, crease resistance, refractive index, x-ray opacity, etc. These properties remain to be tested; however, improvements based on this dual nanocomposite system using both the zirconia-based clusters and the nanoclay are incorporated as part of this application regardless of the method of manufacture.

DESCRIPTION OF THE PREFERRED EMBODIMENTS

Figure 4:
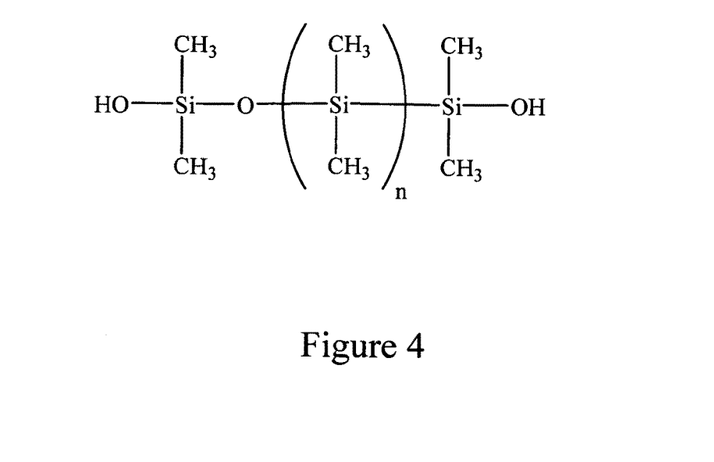
FIG. 4 illustrates the structure of PS 340, Silanol Terminated, Poly(dimethylsiloxane), PDMS, (n~7 to 8)

In an effort to retard the hydrolysis and condensation of Zirconium alkoxides specifically for silicone systems, a series of experiments replacing some of the water normally used for hydrolysis with silanol terminated poly(dimethylsiloxane), (PDMS), was conducted. This PDMS oligomer contained approximately 7 to 8 siloxane repeat units in the chain and was sold as PS 340 from United Chemical Technologies. See FIG. 4. A cyclic siloxane, decamethylcyclopentasiloxane, was used as the solvent for growing the zirconia/PDMS cluster. The ratio of OH groups to Zirconium atoms was between 3.85 and 4. Of this ratio the number of OH groups coming from the PDMS oligomer ($[OH]_{PDMS}/Zr$) was varied between 0 and 2.4. The objective was to vary the structure and the size of zirconia/PDMS clusters through variation of the PDMS/Zr ratio. As the amount of PDMS was increased, the nanocluster solutions became more stable. These zirconia solutions in the cyclic siloxane were then directly added to one of the components of the LSR and mixed for several hours.

As an additional nanomaterial additive, nanoclays have been successfully incorporated in LSR coating formulation. A modified commercially available montmorillonite clay (Cloisite® 10A, Southern Clay Products, Inc.) was dispersed into the cyclic siloxane fluid at a level of 10 wt % clay. This dispersion was added to component B of the LSR formulation. The mixture containing part B and the clay in the cyclic siloxane was then sealed in a nitrogen atmosphere. When allowed to sit overnight, bubbles would develop in this mixture. As there is no catalyst present in component B, it is believed that the bubbles were due to $H_2$ gas generated from a reaction between the hydrosilane and the hydroxyl groups on the edges of clay particles.

Silicone coatings containing different nanophase materials (e.g., zirconia/PDMS nanoclusters, clay nanoparticles and a mixture of zirconia/PDMS nanoclusters and clay nanoparticles) showed that the Persoz hardness and Tensile Tear Strength of coatings is a function of the microstructure and the type of the nanophase material. The Persoz hardness data of pure and nanocomposite coatings that were cured at 190° C. for 60 min. are listed in Table I.

TABLE I

Persoz hardness values of pure and nanocomposite coatings that were cured at 190° C. for 60 min.

| Type | Average Persoz Hardness |
| --- | --- |
| Pure silicone | 84.7 |
| Silicone with ~3 wt % clay (10A) | 56.5 |
| Silicone with ~21 wt % zirconia/PDMS cluster (predominately Structure II) | 69.3 |
| Silicone with ~1.5 wt % clay (10A) + ~10.5 wt % zirconia/PDMS cluster (predominately Structure II) | 72.1 |
| Silicone with ~21 wt % vinyl functionalized zirconia/PDMS (predominately Structure II) | 93.8 |

Among all nanocomposite samples, the Persoz Hardness of the sample containing 3 wt % clay nanoparticles was the lowest, and combining clay nanoparticles with zirconia/PDMS nanosized clusters (predominately Structure II) reduces the decrease in the hardness of silicone coating. Further, it was observed that hardness of silicone coatings can be increased by adding vinyl functionalized zirconia/PDMS clusters. The Persoz hardness of this nanocomposite sample was ~94, while it was ~85 for the pure silicone coating.

Figure 5:
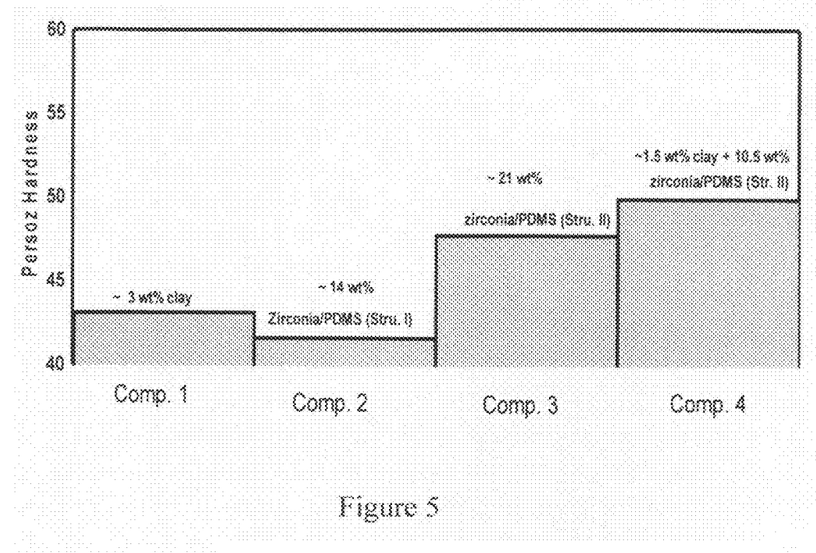
FIG. 5 illustrates the Persoz hardness of four different nanocomposite silicone coatings that were cured at 190° C. for 60 minutes.
Figure 6:
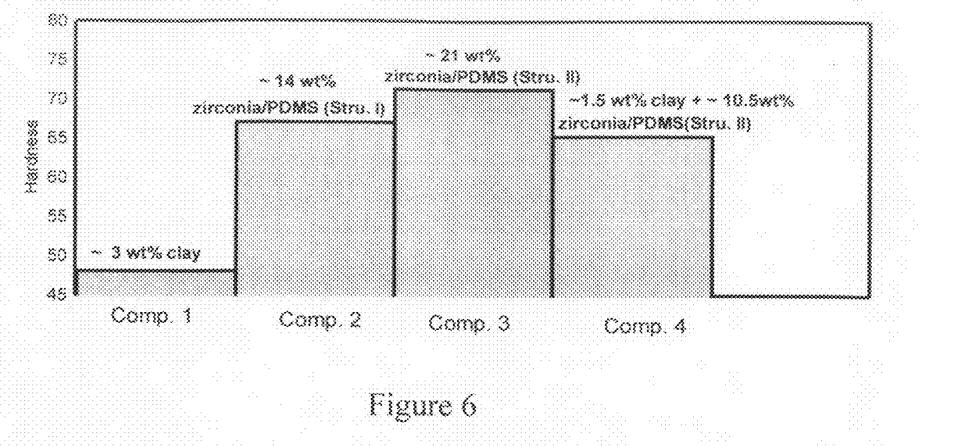
FIG. 6 illustrates the Persoz hardness of nanocomposite coatings aged at 120° C. for 15 hrs after being cured at 190° C. for 60 min.
Figure 7:
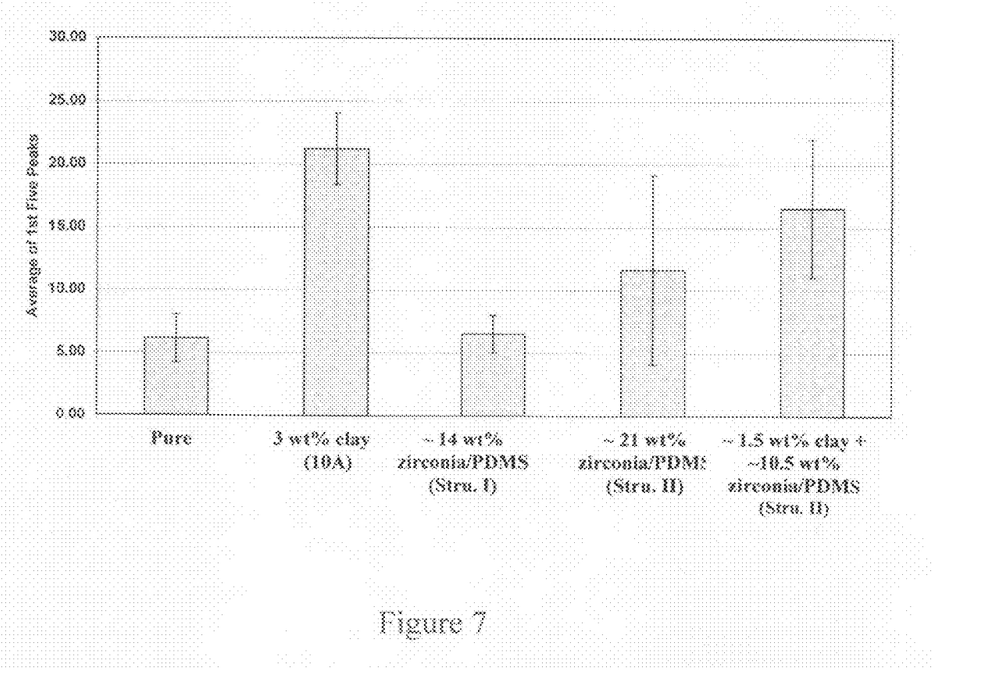
FIG. 7 illustrates the tearing Strength of Coated Fabrics (Fiberglass) using Option 1 of testing standard ASTM D2261.

FIGS. 5-7 herein illustrate various properties of the various coating formulations. FIG. 5 illustrates the Persoz hardness of four different nanocomposite silicone coatings that were cured at 190° C. for 60 minutes. FIG. 6 illustrates the Persoz hardness of nanocomposite coatings aged at 120° C. for 15 hrs after being cured at 190° C. for 60 min. FIG. 7 illustrates the tearing Strength of Coated Fabrics (Fiberglass) using Option 1 of testing standard ASTM D2261.

Nanocomposite coatings that were cured at 190° C. for 60 min showed that the hardness of silicone coatings containing a mixture of 1.5 wt % clay nanoparticles and ~7 wt % zirconia/PDMS nanoclusters with a $[OH]_{PDMS}/Zr$ of 2.4 was largest among all the nanocomposite coatings (FIG. 5). In another set of hardness measurements, nanocomposite samples, initially cured at 190° C., were further aged at 120° C. for 15 hrs. It was observed that post annealing step has a positive effect on the hardness values of both pure and nanocomposite coatings containing zirconia/PDMS nanoclusters. However, the hardness of the nanocomposite coating with 3 wt % of clay nanoparticles did not change on aging (FIG. 6).

In the case of the Tear Strength, the greatest improvement over the pure sample was seen with the 3 wt % Clay (FIG. 7). The ~14 wt % zirconia/PDMS nanosized clusters (equivalent of 2.5-3 wt % zirconia) with a $[OH]_{PDMS}/Zr$ ratio of 1.2 (predominately Structure I) did not appear to improve or degrade the Tear Strength. Adding ~21 wt % of zirconia/PDMS nanosized clusters (equivalent of 2.5-3 wt % zirconia) with a $[OH]_{PDMS}/Zr$ ratio of 2.4 (predominately Structure II) appears to have improved the tear strength, but this is difficult to confirm since the scatter in the data was much greater than that of the pure sample. The sample containing both 1.5 wt % clay and ~10.5 wt % zirconia/PDMS nanosized clusters (predominately Structure II, equivalent of 1.25-1.5 wt % zirconia) showed improvement and increased scattering of the data as compared to both pure and the nanocomposite sample containing 3 wt % clay particles. During testing it was noted that the fabrics with coatings containing zirconia/PDMS nanosized clusters (predominately Structure II) had a larger damage area along the tear.

Formulation

In a preferred coating formulation, 2.76 g of a silanol terminated polysiloxane oligomer is dissolved in 20 grams of Decamethylcyclopentasiloxane solvent. 3.12 g of zirconium n-butoxide in n-butanol (76-80% zirconium butoxide) is added into the solution. Terminal hydroxyl groups on polysiloxane oligomer hydrolyzes zirconium n-butoxide to form zirconia/PDMS nanosized clusters (predominately Structure II). The solution is stirred for about 15 hrs before dropwise addition of 0.44 g of distilled water. This is referred as zirconia/PDMS sol. 5 g of zirconia/PDMS sol is mixed with 4.0 g of part A of the LSR coating formulation. To prepare clay-modified part B, an exfoliated (i.e. the separation of the individual platelets) dispersion of 10 wt % clay (10A) in Decamethylcyclopentasiloxane solvent is first prepared. 10 wt % clay suspension is prepared by mixing an appropriate amount of Cloisite 10A (Southern Clay) in the solvent with a high shear mixer at 4000 RPM for couple of minutes. 1.83 g of 10 wt % clay suspension is then added to 6.00 gm of part B. This mixture is stirred thoroughly for 5 minutes then periodically over 3 hrs. The evolution of gas bubbles is observed at this stage. Next, 5.22 g of the clay-modified part B along with an additional 0.01 wt % of Pt-cyclovinylsiloxane catalyst is added to the beaker containing zirconia/PDMS-modified part A. The LSR coating is then degassed for 15 minutes under vacuum. This formulation is ready for preparing free standing films and fabric coated samples. The preferred weight loading of the zirconia/PDMS cluster in the cured coating is 2 to 40 wt %, and it is 0.5 to 10 wt % for clay nanoparticles.

Example 1

Into a 100 ml Erlenmeyer flask is added 30.0 grams of Decamethylcyclopentasiloxane (Sigma Aldrich 97%) and a Teflon stirring bar. To this is added 4.68 grams of a Zirconium n-butoxide solution in n-butanol (76-80% zirconium butoxide). The solution is stirred for 10 minutes. Continuing to stir 0.610 grams of 2.0 Molar hydrochloric acid is added dropwise. The solution goes from hazy to a cloudy white opaque appearance. The sample is then stirred for an additional 15 hours. This solution is then incorporating into part B of Dow Corning® 3730. Resulting films have a matte finish with poor transparency.

Example 2

Into a 100 ml Erlenmeyer flask is added 20.0 grams of Decamethylcyclopentasiloxane (Sigma Aldrich 97%), 0.69 grams of a silanol terminated polysiloxane oligomer (PS 340 United Chemical Technologies), and a Teflon stirring bar. After stirring for 5-10 minutes the resulting solution is cloudy. To this is added 3.12 grams of a Zirconium n-butoxide solution in n-butanol (76-80% zirconium butoxide) While stirring the solution begins to go from cloudy to a translucent hazy appearance. After stirring overnight, ~15 hours, 0.55 grams of distilled water are added dropwise to the solution. After several hours the viscosity of the solution increases until a hazy gel is produced. This zirconia sol was not evaluated in the LSR coatings.

Example 3

Into a 100 ml Erlenmeyer flask is added 20.0 grams of Decamethylcyclopentasiloxane (Sigma Aldrich 97%), 4.07 grams of a silanol terminated polysiloxane oligomer (PS 341 United Chemical Technologies), and a Teflon stirring bar. After stirring for 5-10 minutes the resulting solution is cloudy. To this is added 3.12 grams of a Zirconium n-butoxide solution in n-butanol (76-80% zirconium butoxide). While stirring the solution begins to go from cloudy to a translucent hazy appearance. After stirring overnight, ~15 hours, 0.55 grams of distilled water are added dropwise to the solution. After several hours the viscosity of the solution increases until a hazy gel is produced. This zirconia sol was not evaluated in the LSR coatings.

Example 4

Synthesis of a Silicone Nanocomposite Coating with Zirconia/PDMS Nanosized Cluster (~14 wt %) with a Predominately Structure I Configuration To prepare Zirconia/PDMS nanosized clusters with a predominately Structure I configuration, 20.0 grams of Decamethylcyclopentasiloxane (Sigma Aldrich 97%) and 2.76 grams of a silanol terminated polysiloxane oligomer (PS 340 United Chemical Technologies) are combined in a 100 ml Erlenmeyer flask containing a Teflon stirring bar. After stirring for 5-10 minutes the resulting solution is cloudy. To this is added 3.12 grams of a zirconium n-butoxide solution in n-butanol (76-80% zirconium butoxide). While stirring, the solution begins to go from cloudy to a translucent hazy appearance. After stirring overnight, ~15 hours, 0.44 grams of distilled water is added dropwise to the solution. The solution initially becomes hazy, but clears with time. After 2 hours of stirring, 10.0 grams of the clear Zirconia sol is added to 4.0 grams of Dow Corning® 3730 Part A and stirred for 3 hours. The evolution of bubbles is observed during this mixing step. The beaker containing this solution is then covered and placed in a sonicating bath for 1 hour. After sonication, the solution containing the Zirconia and Part A is allowed to cool. Next, 4.0 grams of Dow Corning® 3730 Part B is added along with an additional 0.01 wt % of Pt-cyclovinylsiloxane catalyst (PC085 from United Chemical Technologies) and stirred thoroughly for 5 minutes. Finally, the LSR coating is degassed for 15 minutes under full vacuum (<5 ton). The resulting uncured coating formulation is then used to prepare free-standing films and coated fabric (densely woven fiberglass) samples applied using a single pass of a #20 wirewound rod from Paul N. Gardner Company. Curing is conducted at 190° C. for 60 minutes. Coated fabric (densely woven fiberglass) samples are subsequently aged at 120° C. for 15 hours. The unused Zirconia sol remains clear and fluid for several days.

Example 5

Synthesis of a Silicone Nanocomposite Coating with Zirconia/PDMS Nanosized Cluster (~21 wt %) with a Predominately Structure II Configuration To prepare Zirconia/PDMS nanosized clusters with a predominately Structure II configuration, 20.0 grams of Decamethylcyclopentasiloxane (Sigma Aldrich 97%) and 5.53 grams of a silanol terminated polysiloxane oligomer (PS 340 United Chemical Technologies) are added into a 100 ml Erlenmeyer flask containing a Teflon stirring bar. After stirring for 5-10 minutes the resulting solution is cloudy. To this is added 3.12 grams of a zirconium n-butoxide solution in n-butanol (76-80% zirconium butoxide). While stirring, the solution begins to go from cloudy to a translucent hazy appearance. After stirring overnight, ~15 hours, 0.29 grams of distilled water is added dropwise to the solution. The solution initially becomes hazy, but clears with time. After 2 hours of stirring, 10.0 grams of the clear Zirconia sol is added to 4.0 grams of Dow Corning® 3730 Part A and stirred for 3 hours. The evolution of bubbles is observed during this mixing step. The beaker containing this solution is then covered and placed in a sonicating bath for 1 hour. After sonication, the solution containing the Zirconia and Part A is allowed to cool. Next, 4.0 grams of Dow Corning® 3730 Part B is added along with an additional 0.01 wt % of Pt-cyclovinylsiloxane catalyst (PC085 from United Chemical Technologies) and stirred thoroughly for 5 minutes. Finally, the LSR coating is degassed for 15 minutes under full vacuum. The resulting uncured coating formulation is then used to prepare free-standing films and coated fabric (densely woven fiberglass) samples using a single pass of a #20 wirewound rod from Paul N. Gardner Company. Curing is conducted at 190° C. for 60 minutes. Coated fabric samples (densely woven fiberglass) are subsequently aged at 120° C. for 15 hours. The unused Zirconia sol remains clear and fluid for several days.

Example 6

Synthesis of a Silicone Coatings with a Dual Nanocomposite System (1.5 wt % Clay Nanoparticles and ~10.5 wt % Zirconia/PDMS Nanosized Clusters (Predominately Structure II)

To prepare Zirconia/PDMS nanosized clusters with a predominately Structure II configuration, the procedure described above in Example 5 is followed. In this case, 5.0 grams of the clear Zirconia sol is added to 4.0 grams of Dow Corning® 3730 part A and stirred for over 3 hours. The evolution of bubbles is observed during this mixing step. The beaker containing this solution is then covered and placed in a sonicating bath for 1 hour. After sonication, the solution containing the Zirconia and Part A is allowed to cool.

To prepare clay-modified Part B, an exfoliated dispersion of 10 wt % clay in solvent is first prepared. To do the exfoliation, 25.00 grams Cloisite 10A (Southern Clay) and 225.00 grams of Decamethylcyclopentasiloxane (Sigma Aldrich 97%) are combined in a 200 cc LDPE mixing cup. Mixing is then started at 4000 RPM for 2 minutes with a Silverson high shear mixer and fine emulsor stator. At this time, 0.25 cc of a neutral phosphate buffer solution (Fisher Scientific) is added. The mixing speed is then increased to 8000 RPM for 5 minutes. Next, the dispersion is transferred to a flask which is sealed with a rubber septum and sonicated for five hours in a warm water bath. 1.83 grams of this exfoliated clay solution is then added to 6.00 grams of Dow Corning® 3730 Part B. This mixture is stirred for 3 hours. The evolution of gas bubbles is observed in this stage. Next, 5.22 grams of the clay-modified Part B along with an additional 0.01 wt % of Pt-cyclovinylsiloxane catalyst (PC085 from United Chemical Technologies) is added to the beaker containing Zirconia-Part A and stirred thoroughly for 5 minutes. Finally, the LSR coating is degassed for 15 minutes under full vacuum. The resulting uncured coating formulation is then used to prepare free-standing films and coated fabric (densely woven fiberglass) samples applied using a single pass of a #14 wirewound rod from Paul N. Gardner Company. Curing is conducted at 190° C. for 60 minutes. Coated fabric samples are subsequently aged at 120° C. for 15 hours.

Example 7

Synthesis of a Silicone Nanocomposite Coating with Vinyl Functionalized Zirconia/PDMS Nanosized Clusters (~21 wt %) with Predominately Structure II Configuration To prepare vinyl functionalized Zirconia/PDMS nanosized clusters with a predominately Structure II configuration, 20.0 grams of Decamethylcyclopentasiloxane (Sigma Aldrich 97%) and 5.53 grams of a silanol terminated polysiloxane oligomer (PS 340 United Chemical Technologies) are added into a 100 ml Erlenmeyer flask containing a Teflon stirring bar. After stirring for 5-10 minutes the resulting solution is cloudy. To this is added 3.12 grams of a zirconium n-butoxide solution in n-butanol (76-80% zirconium butoxide). While stirring, the solution begins to go from cloudy to a translucent hazy appearance. After stirring overnight, ~15 hours, 0.29 grams of distilled water is added dropwise to the solution. The solution initially becomes hazy, but clears with time. After 1 hour of stirring, 1.74 grams of 3-methacryloxypropyltrimethoxysilane (SIM6487.4, Gelest) is added to the flask. After stirring for 5 minutes, 0.11 g of a 0.2M HCl solution is added dropwise to the solution. Stirring is continued for 1 hour followed by mixing with Part A immediately. 10.0 grams of the functionalized Zirconia sol is added to 4.0 grams of Dow Corning® 3730 Part A and stirred for 3 hours. The evolution of bubbles is observed during this mixing step. The beaker containing this solution is then covered and placed in a sonicating bath for 1 hour. After sonication, the solution containing the Zirconia and Part A is allowed to cool. Next, 4.0 grams of Dow Corning® 3730 Part B is added along with an additional 0.01 wt % of Pt-cyclovinylsiloxane catalyst (PC085 from United Chemical Technologies) and stirred thoroughly for 5 minutes. Finally, the LSR coating is degassed for 15 minutes under full vacuum. The resulting uncured coating formulation is then used to prepare free-standing films and coated fabric (densely woven fiberglass) samples using a single pass of a #20 wirewound rod from Paul N. Gardner Company. Curing is conducted at 190° C. for 60 minutes. Coated fabric samples are subsequently aged at 120° C. for 15 hours.

Example 8

Synthesis of Silicone Nanocomposite Coating with ~3 wt % Clay Nanoparticles

To prepare clay-modified Part B, an exfoliated dispersion of 10 wt % clay in solvent is first prepared. To do this, 25.00 grams Cloisite 10A (Southern Clay) and 225.00 grams of Decamethylcyclopentasiloxane (Sigma Aldrich 97%) are combined in a 200 cc LDPE mixing cup. Mixing is then started at 4000 RPM for 2 minutes with a Silverson high shear mixer and fine emulsor stator. At this time, 0.25 cc of a neutral phosphate buffer solution (Fisher Scientific) is added. The mixing speed is then increased to 8000 RPM for 5 minutes. Next, the dispersion is transferred to a flask which is sealed with a rubber septum and sonicated for five hours in a warm water bath. 2.47 grams of this exfoliated clay solution is then added to 4.00 grams of Dow Corning® 3730 Part B. This mixture is stirred for 3 hours. The evolution of gas bubbles is observed in this stage.

This results in an exfoliated clay dispersion, where the individual clay platelets which comprise the clay particles are separated from each other, in contrast to a non-exfoliated dispersion, where the stacks of clay platelets are held tightly together by electrostatic forces. Exfoliation occurred since the natural Montmorillonite clay was organically modified by an ion exchange reaction. The cations in the natural clay, usually sodium, are loosely bound to the clay platelets and these small ions were replaced by organic cations such as ammonium or phosphonium ions. The long alkyl chains on the ammonium ions make the modified clay compatible with an organic matrix. In the meantime, exchanged clay has larger inter-platelet spacing, making it easier for clay platelets to be intercalated and exfoliated.

Next, 4.00 grams of Dow Corning® 3730 Part A along with an additional 0.01 wt % of Pt-cyclovinylsiloxane catalyst (PC085 from United Chemical Technologies) is added and stirred thoroughly for 5 minutes. Finally, the LSR coating is degassed for 15 minutes under full vacuum. The resulting uncured coating formulation is then used to prepare free-standing films and coated fabric (densely woven fiberglass) samples applied using a single pass of a #5 wirewound rod from Paul N. Gardner Company. Curing is conducted at 190° C. for 60 minutes. Coated fabric samples are subsequently aged at 120° C. for 15 hours.

The invention has been described with respect to preferred embodiments. However, as those skilled in the art will recognize, modifications and variations in the specific details which have been described and illustrated may be resorted to without departing from the spirit and scope of the invention as defined in the appended claims

We claim:

1. A coating for fabrics produced by the process comprising the steps of:
   a) providing a silicone base;
   b) preparing a first filler of nanosized clusters of polydimethylsiloxane (PDMS) and a metal oxide, said nanosized clusters of said first filler having an ordered structure formulated by controlling the relative proportions of a PDMS oligomer and a metal oxide precursor;
   c) adding the first filler to the silicone base; and
   d) adding a second filler of clay particles to the silicone base, said first and second fillers providing enhanced mechanical and thermal properties to the silicone base.

2. The coating as claimed in claim 1 wherein the ordered structure of the nanosized clusters of PDMS and a metal oxide is at least one of: linear and tetrameric.

3. The coating as claimed in claim 1 wherein the nanosized clusters and the silicone base form a bimodal network having both short and long chains.

4. The coating as claimed in claim 1 wherein the metal oxide of the first filler comprises at least one of: zirconia, alumina, yttria and hafnia.

5. The coating as claimed in claim 1 wherein the clay particles of the second filler comprise montmorillonite clay.

6. The coating as claimed in claim 5 wherein the montmorillonite clay particles have been exfoliated.

7. The coating as claimed in claim 1 wherein the silicone base comprises liquid rubber silicone.

8. The coating as claimed in claim 1 further including the step of curing the coating.

9. The coating as claimed in claim 8 wherein the weight loading of the nanosized clusters in the finished coating is 2 to 40 wt % after curing.

10. The coating as claimed in claim 8 wherein the weight loading of clay nanoparticles in the finished coating is 0.5 to 10 wt % after curing.

11. The coating as claimed in claim 8 wherein the nanosized clusters contain reactive functional groups that will react with ≡Si—H groups of the silicone coating formulation during curing to cause the nanoclusters to become part of the silicone elastomeric network structure.

12. The coating as claimed in claim 1 wherein the particle size of the clay nanoparticles is ≦25 nm.

13. The coating as claimed in claim 1 further including the step of applying the coating to at least one layer of fabric.

14. The coated fabric as claimed in claim 13, wherein the at least one layer of fabric material comprises at least one of: fiberglass, poly-paraphenylene terephthalamide, nylon and liquid crystal aromatic polyester.

15. A method for producing a coating for fabrics comprising the steps of:
   a) mixing a polydimethylsiloxane (PDMS) oligomer and a metal oxide precursor;
   b) controlling the relative proportions of a PDMS oligomer and a metal oxide precursor so that an ordered structure is formed comprising nanosized clusters of (PDMS) and a metal oxide, the ordered structure being at least one of: linear and tetrameric in configuration and said ordered structure forming a first filler;
   c) adding the first filler of nanosized clusters of (PDMS) and a metal oxide to a silicone base, and
   d) adding a second filler of clay particles to the silicone base, said first and second fillers providing enhanced mechanical and thermal properties to the silicone base.

16. The method as claimed in claim 15 wherein the metal oxide of the first filler comprises at least one of: zirconia, alumina, yttria and *hafnia*.

17. The method as claimed in claim 15 wherein the clay particles of the second filler comprise montmorillonite clay.

18. The coating as claimed in claim 15 further including the step of curing the coating.

19. The coating as claimed in claim 15 further including the step of applying the coating to at least one layer of fabric.

20. A coating for fabrics produced by the process comprising the steps of: a) mixing a polydimethylsiloxane (PDMS) oligomer and a metal oxide precursor;

b) controlling the relative proportions of a PDMS oligomer and a metal oxide precursor so that an ordered structure is formed comprising nanosized clusters of (PDMS) and a metal oxide, the ordered structure being at least one of: linear and tetrameric in configuration and said ordered structure forming a first filler;

c) adding the first filler of nanosized clusters of (PDMS) and a metal oxide to a silicone base, the nanosized clusters containing reactive functional groups that will react with ≡Si—H groups of the silicone coating formulation upon curing to cause the nanoclusters to become part of the silicone elastomeric network structure; and d) adding a second filler of clay particles to the silicone base, said first and second fillers providing enhanced mechanical and thermal properties to the silicone base.

* * * * *